Nov. 20, 1934.    G. A. MITCHELL    1,981,185
FOLLOW FOCUS MECHANISM
Filed March 27, 1933    3 Sheets-Sheet 1

Inventor
George A. Mitchell.
Attorney.

Inventor
George A. Mitchell.

Attorney.

Nov. 20, 1934.  G. A. MITCHELL  1,981,185
FOLLOW FOCUS MECHANISM
Filed March 27, 1933   3 Sheets-Sheet 3
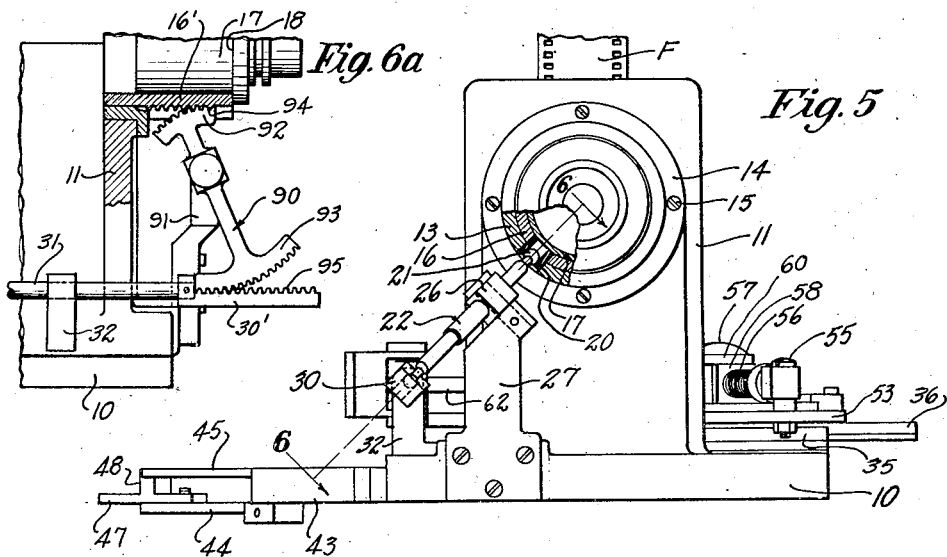
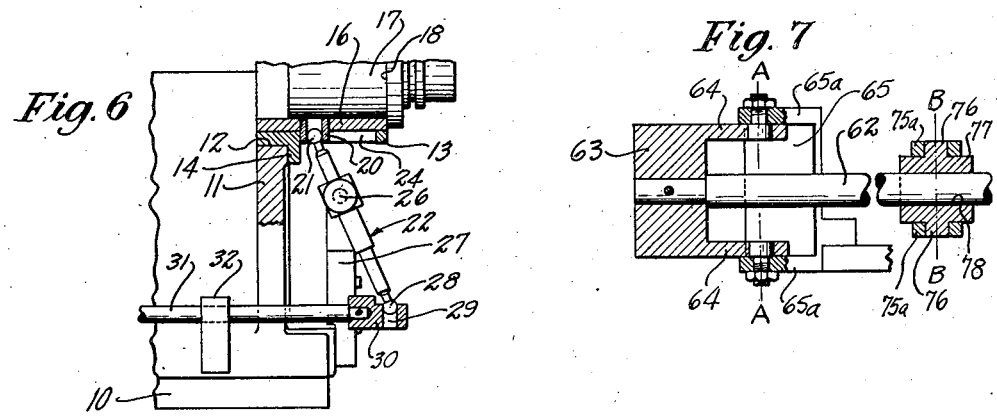
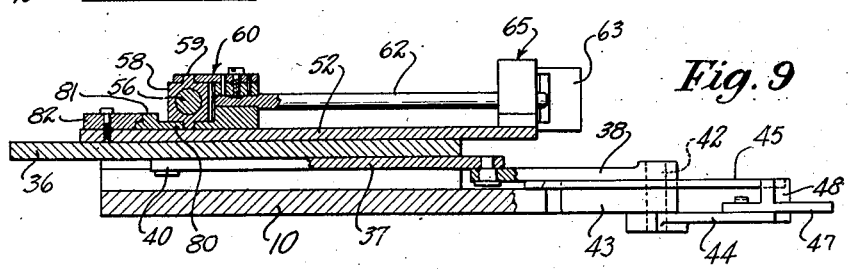
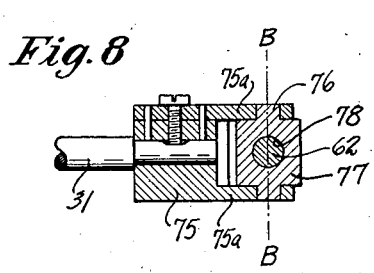
Inventor
George A. Mitchell.
Attorney Patented Nov. 20, 1934

1,981,185

UNITED STATES PATENT OFFICE 1,981,185

FOLLOW FOCUS MECHANISM

George A. Mitchell, Los Angeles, Calif., assignor to Mitchell Camera Corporation, West Hollywood, Calif., a corporation of Delaware Application March 27, 1933, Serial No. 662,957

20 Claims. (Cl. 95—45)

This invention has reference to lens focusing mechanisms for optical instruments such as cameras, and particularly motion picture cameras, and since the invention has its principal present utility as applied to motion picture cameras will be hereinafter described with that use chiefly in view, but without necessary limitation thereto.

In the past motion picture cameras have been equipped with means for focusing the photographic lens by means of a manual focusing member operable from a position at the rear of the camera, and with suitable indicating scales which can be viewed from that position, in order to enable the camera man to focus the lens on an object with a minimum expenditure of time, or to "follow" approaching or receding action during the taking of a scene. Ordinarily the camera is equipped with several photographic lenses of varying focal lengths for use under varying circumstances, and without special compensating provisions, it is necessary to provide a separate distance scale for the focusing mechanism for each of such lenses, since, as is well known, the distance a lens must be moved in focusing between close-up and infinity is determined by the focal length of that lens. For instance, a lens of relatively short focal length, as 35 mm., will have a comparatively short range of focusing movement, whereas a lens of relatively long focal length, as 4½ inches, will have a comparatively long range of focal movement. Obviously, under such circumstances, the lenses of longer focal length can usually be set with greater average accuracy than can the shorter focal length lenses. Means have also been provided in the prior art for adjusting the velocity ratio between the manual focusing member and the movable lens mount for the purpose of compensating these differences, so that by properly adjusting the focusing mechanism a fixed range of movement of the manual focusing member along a fixed distance scale is made to serve for all lenses.

It may be stated as a primary object of the present invention to provide an improved follow focus mechanism of the class mentioned, having compensating adjustments for varying the velocity ratio between the manual member and the lens to enable adjusting the mechanism to suit the lens used, and characterized by simplicity, facility and convenience of operation, and extreme accuracy.

The invention will best be understood without further preliminary discussion by now referring to the following detailed description of a present preferred embodiment of the invention, reference for this purpose being had to the accompanying drawings, in which:

Fig. 5 is a front elevation of the device;

Fig. 6 is a section taken on line 6—6 of Fig. 5;

Fig. 6a is a view similar to Fig. 6 but showing a modified form;

Fig. 7 is a detailed section taken on line 7—7 of Fig. 2;

Fig. 8 is a detailed section taken on line 8—8 of Fig. 2; and

Fig. 9 is a section on broken line 9—9 of Fig. 1.

Figure 1:
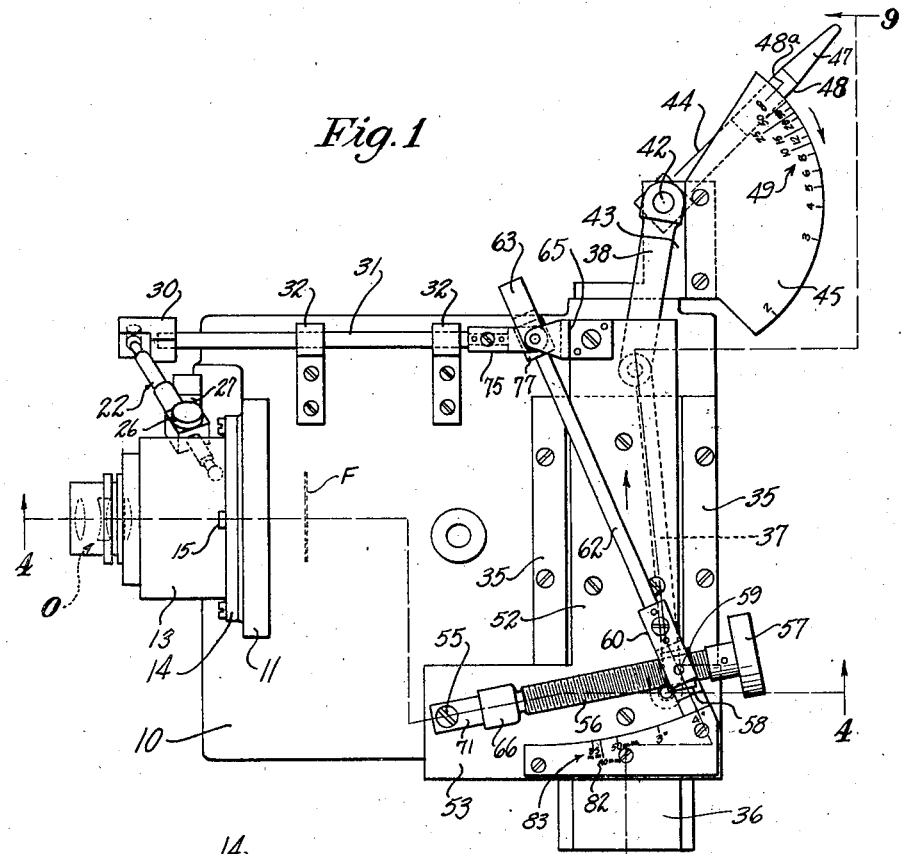
Fig. 1 is a plan view of the focusing mechanism of the present invention.

For simplicity the present invention is shown in connection with a photographic lens mount, and the position of a photographic film back of said mount is designated, but the balance of the camera mechanism is omitted from the drawings as such mechanism is well understood in the art and a present description thereof is not necessary to a full disclosure of the present invention.

In the drawings the numeral 10 designates a base plate having a head plate 11 extending upwardly from its forward end. Plate 11 has a circular opening 12 within which is taken a supporting tube 13, said tube 13 having a flange 14 coming against the forward surface of plate 11 and fastened thereto as by screws 15. Slidable in the bore of tube 13 is a lens mount carrier tube 16, and within the bore of said tube 16 is taken the lens mount tube 17, within which is the photographic lens assembly O. This lens tube 17 is simply slipped within the bore of the carrier tube 16 and is held therein by friction, being properly positioned in said tube 16 by engagement of its shoulder 18 with the outer end of tube 16. When a lens in the camera is to be changed, the lens tube 17 is merely pulled straight out of carrier tube 16 and replaced by another.

The carrier tube 16 is provided in one side with a short outwardly projecting tube 20 that forms a socket for a ball 21 on the end of an operating lever 22 (Fig. 6). Tube 20 projects outwardly from carrier tube 16 through a longitudinal slot 24 in the mounting barrel 13, tube 20 working in said slot 24 as the lens carrier tube slides back and forth in barrel 13. Lever 22 is pivoted at 26 on a frame bracket 27 so as to swing in a plane extending outwardly and downwardly from the lens mount (Fig. 5). The lower end of lever 22 is formed with a ball 28 which is taken within a socket 29 formed in a head 30 mounted on the end of a horizontal rearwardly extending slide rod 31, slide bearings 32 being provided on the frame for said rod. As will be seen from Fig. 5, the ball sockets in the lens carrier tube and in head 30 are cylindrical in shape and extend in the direction of the plane of swing of the lever, so as to accommodate the necessary relative movement of the ball ends of the lever in the sockets as the lever swings. It will be obvious how reciprocation of rod 31 acts through lever 22 to slide the lens carrier tube and lens mount back and forth in barrel 13. It should be here noted that rod 31 is to be regarded broadly as a movable lens operating member adapted to move the lens on its axis, the details of the specific interconnection between member 31 and the lens being susceptible to considerable modification. For instance, Fig. 6a shows a variational interconnection between member 31 and the lens tube in the mechanism described, which may be preferred in many cases. The lever 22 is shown replaced by a gear element 90 pivoted on bracket 91 and having gear segments 92 and 93 meshing respectively with rack teeth 94 and 95 on the lens carrier tube, the latter here designated at 16', and the lens carrier block 30' on the end of rod 31. The lens carrier tube 16' and rod 31 may otherwise be exactly similar to carrier tube 16 and rod 31 in the embodiment previously described. It will be obvious that the lens tube will be moved in direct proportion to the movement of operating rod 31.

Back of the lens mount is the image plane of the photographic lens, and a photographic film is diagrammatically indicated in said plane at F. No means for supporting or moving the film are shown, as such means are well known and form no part of the present invention.

Means now to be described are provided for operating slide rod 31 by a manual member to move the lens between positions of close-up and infinity, and for varying the velocity ratio of the manual member to rod 31 to compensate for lenses requiring different ranges of focusing movement.

Extending transversely across the rearward portion of base member 10 is a pair of guides 35 for a slide-plate 36 (Fig. 9). Slide-plate 36 is operated to slide back and forth in guides 35 by means of a pair of toggle arms 37 and 38 arranged below the plate, arm 37 being pivotally connected to said plate at a point 40 near the left hand end thereof, as viewed from the rear of the camera, and arm 38 being fast on the upper end of a shaft 42 mounted for rotation in a bracket 43 that extends to the right from the camera base. On the lower end of shaft 42 is fastened the manual operating arm 44. Bracket 43 also supports a sector shaped plate 45, the arcuate edge of which is concentric with the axis of operating arm 44 and extends along the path of movement of said arm. The outer end of arm 44 carries a finger piece 47 on which is an indicating element 48 that moves adjacent the arcuate edge of plate 45, element 48 having an indicating mark 48a opposite the distance scale 49 engraved on plate 45. For convenience of reading as well as operation, the manual operating arm 44 and scale member 45 are here shown to extend rearwardly from the camera, although other positions may of course be employed. It will be noted that slider plate 36 is given a definite amount of movement by operation of the manual member 44 between the indicated positions for infinity and the close-up distances at the opposite end of the scale. The operative interconnection now to be described between slider plate 36 and lens operating rod 31 is then adjustable for various amounts of movement to be imparted to lens operating rod 31 by a given movement of the slider plate, so that the fixed distance scale will serve for focusing of lenses of different focal lengths.

Mounted on slider plate 36 is a carrier plate or platform 52 (Fig. 4), having at its left hand end a forward extension 53. Slider plate 36 and platform 52 serve as a carrier for an angularly adjustable slide element now to be described, and will accordingly be referred to hereinafter as the carrier member. Mounted to pivot on a pin 55 carried by the forward end of said extension 53 is a swiveled, rearwardly extending lead screw 56 having fast on its rearward end an operating knob 57. The forward end of screw 56 is formed with a socket 66 which receives a bushing 67 through which extends a headed pin 68, the head 69 of the pin being within said socket and being held therein by engagement with bushing 67. Bushing 67 may be fastened in place by means of a pin 70 inserted through a drill hole in socket 66. The other end of pin 68 is received within a socket member 71 which is pivoted on pivot pin 55 mounted on the slider platform, and is fastened therein as by means of a pin 72.

Figure 2:
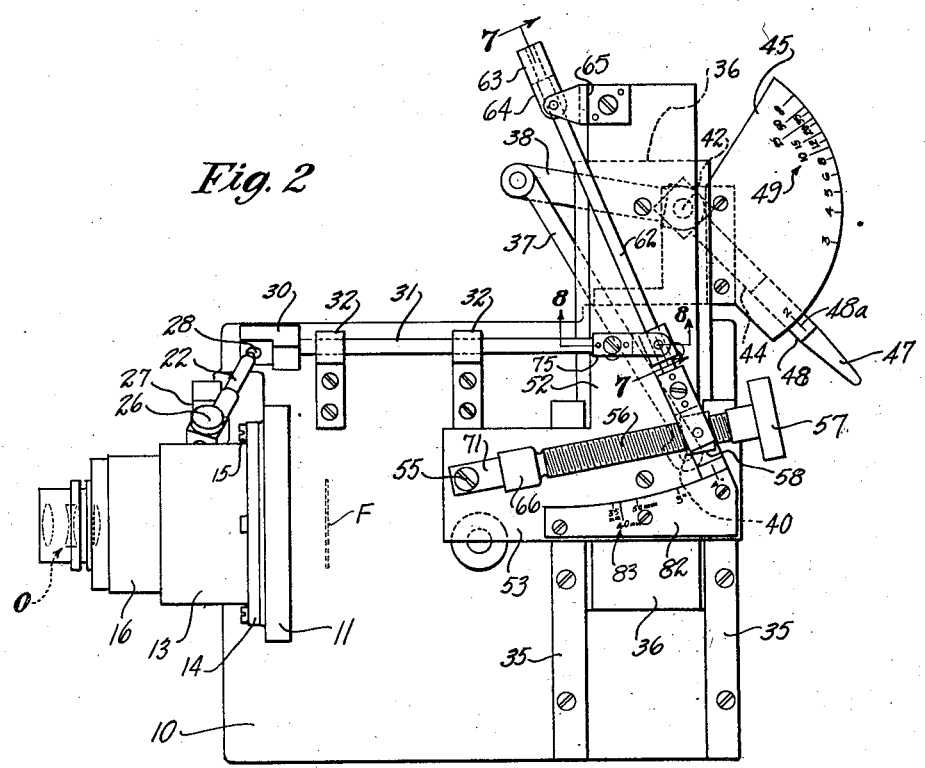
Fig. 2 is a view similar to Fig. 1 but showing the part in another position.
Figure 3:
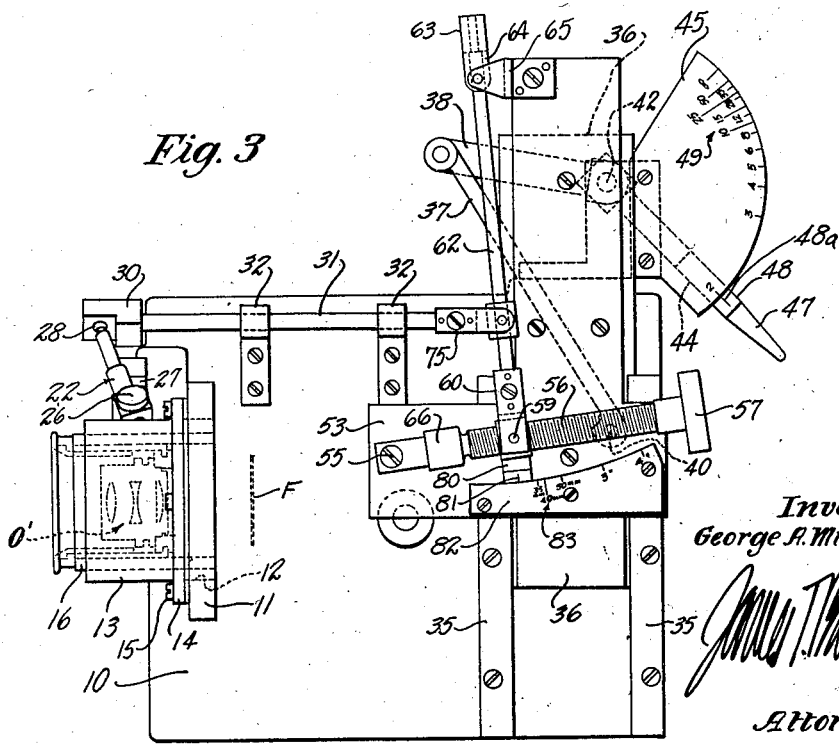
Fig. 3 is another view similar to Fig. 1 but showing the part in still another position.

Working on lead screw 56 is a nut member 58 that is vertically trunnioned at 59 in a yoke-shaped mounting block 60. Block 60 slidably rests on platform 52 and holds the nut member against rotation with the screw when the screw is operated, but is capable of travelling on the platform as the nut member is screwed back and forth. A slide rod 62 is fast at one end in mounting block 60 and is fast at its other end in a yoke 63 (Fig. 7), the arms 64 of which yoke extend backwardly on the rod and are pivoted or trunnioned on a vertical axis A—A between arms 65a of a bracket 65 which is mounted on the forward edge of carrier platform 52, at a point near the right hand end thereof (looking from the rear of the camera). The relative disposition of the parts is such that when screw 56 has been operated by means of knob 57 to screw the nut member 58 to its rearward end (Figs. 1 and 2), rod 62 makes its maximum angle, as illustrated, with the direction of movement of the carrier member, and when the nut member nears its extreme forward position on the screw, rod 62 approaches parallelism with the direction of the carrier member movement (Fig. 3). It will be obvious how rotation of knob 57 and the consequent translation of the nut member on the screw adjusts the angle of rod 62 between its two extreme positions, and how slight relative rotation occurs between the rod end 60 and the nut 58 trunnioned therein, with screw 56 swinging slightly on pivot 55, to accommodate the pivotal action of rod 62 about trunnion axis A—A as a center.

It will be noted that in the position of the carrier illustrated in Fig. 1, which position corresponds to infinity focus, as indicated by distance scale 49, the pivot or trunnion axis A—A of rod 62 on the slider is included in the vertical plane that passes through and is determined by the lens operating slide rod 31. The rear end of slide rod 31 has mounted theron a head or yoke 75 which has arms 75a between which is vertically trunnioned at 76, on a pivot axis B—B, a block 77 having a bore 78 through which slides the previously mentioned rod 62, thus forming what may be termed a slide pivot connection between rod 62 and rod 31. It will be noted that in the position of Fig. 1 the trunnion axis A—A of the yoke 63 on rod 62 coincides with the trunnion axis B—B of block 77 on the yoke 75 of rod 31.

Assuming the device to be in the position of Fig. 1 (infinity focus), it will be seen that operation of lever 44 toward the close-up end of the scale acts through toggle arms 37 and 38 to shift the carrier member and the rod 62 carried thereby bodily in the direction of the arrow. In this operation rod 62 moves longitudinally through the block 77 on the end of slide rod 31, and due to the angular direction of rod 62 with relation to its direction of bodily movement, the block 77 is obviously drawn rearwardly as rod 62 slides through it, thereby causing slide rod 31 to move rearwardly to shift the lens mount in a forward direction. Fig. 2 shows the manual member moved fully to the left, to the position for close-up focus, and Figs. 2 and 7 show how the block 77 moves relatively "up" on rod 62 to draw rod 31 to its extreme rearward position, with the lens mount accordingly moved its extreme distance forwardly.

In Figs. 1 and 2 rod 62 has nearly its extreme angularity with respect to the direction of movement of the carrier on which it is mounted, and it is obvious that the rod 32 and the lens mount are consequently given nearly their maximum amount of movement by movement of manual member 44 between the indicated positions for infinity and close-up.
Fig. 3 shows a position with knob 57 rotated until rod 62 has but small angularity, and it will be obvious that in this case the amount of movement imparted to rod 31 and the lens mount by full movement of the manual member is greatly reduced. Thus the amount of movement given the lens mount by operation of the manual member depends upon the angularity of rod 62 on the carrier member, and it will be obvious that proper angular adjustment of rod 62 by operation of knob 57 therefore serves to adjust the mechanism for lenses of different focal lengths. It is here to be noted that it is not at all necessary that the carrier on which the slide element or rod 62 is mounted be arranged to move at right angles to the direction of movement of the rod 31, as it does in the embodiment here illustrated, and that any direction for the carrier is suitable that permits rod 62 to be adjusted to various angular positions with reference to its line of movement and the line of movement of lens operating member 31.

Figure 4:
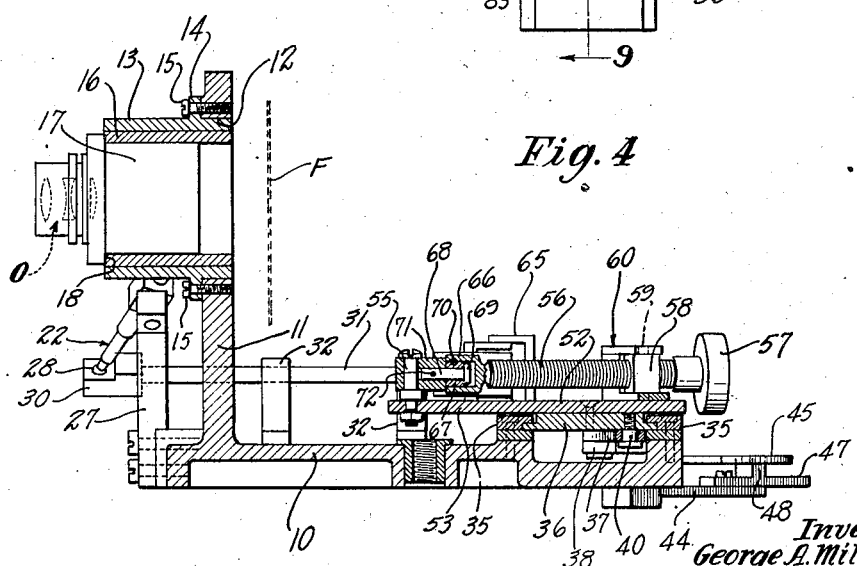
Fig. 4 is a vertical section taken on the broken line 4—4 of Fig. 1.

Considering again Fig. 1, it will be remembered that in the position for infinity focus there illustrated, the axis A—A on which rod 62 pivots when screw 56 is rotated and the pivot axis B—B for the block 77 through which rod 62 slides, are in coincidence. Consequently, so long as the mechanism is set for infinity focus, operation of screw 56 to swing rod 62 simply rotates block 77 on its trunnion axis B—B without moving rod 31 and the lens carrier tube. Thus it will be seen that the position of the lens carrier tube for infinity focus is unaffected by operation of screw 56, and is the same for lenses of all focal lengths. It is well understood that photographic objectives are mounted in their lens tubes in such a way that when a lens tube is fully home in the movable carrier tube of a camera, and the carrier tube is in position for infinity focus, then the lens is ahead of the focal plane (film) of the camera by a distance equal to the focal length of that lens. Thus Figs. 1, 2 and 4 show a lens tube having a relatively long focal length lens, and in the infinity position of Figs. 1 and 4 said lens is located ahead of the film (focal plane) by its focal length. Fig. 3, on the other hand, shows the camera holding a comparatively short focal length lens O', and although Fig. 3 illustrates the mechanism in a position with the lens in forward or close-up position, it will be observed that the lens is located in its tube correspondingly closer to the film than is the longer focal length lens illustrated in the other figures.

Thus it will be understood that when the manual focusing member 44 is in infinity position, no matter what focal length lens is in the camera, and no matter what the setting of screw 56 and rod 62 may be, the lens carrier tube is in a definite, fixed position, and the lens mount tube at that time in the carrier tube will support its lens at a distance ahead of the film equal to the focal length of that lens.

To adjust for lenses of different focal lengths, the velocity ratio between manual member 44 and the lens carrier tube is varied by operation of knob 57 to change the angularity of rod 62, as previously mentioned. For example, the large angularity position of Figs. 1 and 2 is proper for a relatively long focal length lens requiring a relatively long movement forwardly from the infinity position to focus on a close-up object; whereas the relatively small angularity position of Fig. 3 is proper for a relatively short focal length lens requiring but small range of movement forward from its infinity position.

A calibrated scale is provided to aid in setting the angularity of rod 62. Head or yoke 60 to which the nut member 58 on screw 56 is trunnioned, has an extension 80 carrying an indicator 81 that rides along an arcuate scale member 82 bearing a scale 83 calibrated properly, as hereinafter explained, in standard focal lengths of lenses, as shown. When the manual member is in infinity position, the lens carrier tube is in a certain definite position regardless of the setting of rod 62 as indicated by this scale 83, as heretofore mentioned, but when the manual member is moved from infinity position in the direction toward the close-up end of scale 49, the lens operating rod 31 is shifted to set the lens carrier tube by a movement depending in amount upon the angular setting of rod 62, as read in focal lengths of lenses on scale 83. Thus operation of knob 57 until indicator 81 points to the focal length of the lens then in the camera adjusts the velocity ratio of the mechanism for that lens, after which operation of manual member 44 over its full fixed distance scale properly moves the lens for accurately focusing upon an object at any distance between infinity and close-up.

From the foregoing it may be seen that the angularly adjustable slide element 62 acts as a straight line cam, and imparts movements to member 31 directly proportioned to its own movements, and dependent in amount only upon its own angularity. Moreover, preferably and for simplicity's sake, the mechanism between slide element 62 and the lens mount involves only straight line movement transmitting parts. The interconnection between rod 31 and the lens tube shown in Fig. 6a obviously conforms to this requirement. The pivoted lever 22 of Fig. 6 also is no exception to this rule, since although it pivots about a center, with its ends working in boxes in the straight line movement members 31 and 16, the lever functions simply to transfer the straight line movement of rod 31 to equivalent or similar straight line movement of the lens tube. Thus there are only straight line movement transmitting parts between slide element 62 and the lens tube, and the relation between their movements may be expressed by a first degree equation. In the straight line focusing mechanism described there is but one variant, which is the angularly adjustable straight line camming element 62, and the amounts of movement given thereby to the lens moving member 31 vary substantially directly with the tangent of the angle between it and the direction of its movement with carrier platform 52. The scale 83 by which this angle is set is then so calibrated as to take into account the fact that lenses of different focal lengths require focusing movements nearly in proportion to the squares of their respective focal lengths, and indicates the proper setting for the straight line cam element 62 for the various lenses to give the proper movement of the lens as the cam element is operated. It will now be seen that with these provisions made, the straight line characteristic of the lens focusing mechanism between slide element 62 and the lens mount assures that the distance scale 49 when once properly calibrated for a lens of one focal length, will be accurate at every point for a lens of any other focal length when the slide element 62 has been set by scale 83.

It will be understood the drawings and description are merely illustrative of and not restrictive on the broader claims appended hereto, for various changes in design, structure and arrangement may be made without departing from the spirit and scope of said claims.

I claim:

1. In a lens focusing mechanism, the combination of a movable lens moving member adapted to move a lens along its axis, a movable carrier member, a slide element angularly adjustable on said carrier member and having a slide pivot connection with said lens moving member, and means for moving said carrier member.

2. In a lens focusing mechanism, the combination of a movable lens moving member adapted to move a lens along its axis, a movable carrier member, a slide element angularly adjustable about a center on said carrier member and having a slide pivot connection with said lens moving member, said center and said slide pivot connection being co-axial at one point in the movement of said carrier member, and means for moving said carrier member.

3. In a lens focusing mechanism, the combination of a movable lens moving member adapted to move a lens along its axis, a movable carrier member movable back and forth along a determined line, a slide element angularly adjustable on said carrier member with relation to said line of movement and having a slide pivot connection with said lens moving member, and means for moving said carrier member.

4. In a lens focusing mechanism, the combination of a movable lens moving member adapted to move a lens along its axis, a movable carrier member movable back and forth along a determined line, a slide element angularly adjustable about a center on said carrier member with relation to said line of movement and having a slide pivot connection with said lens moving member, said center and slide pivot connection being co-axial at one point in the movement of said carrier member, and means for moving said carrier member.

5. In a lens focusing mechanism, the combination of a movable lens moving member adapted to move a lens along its axis, a movable carrier member movable back and forth along a determined line, a slide element pivoted about a center on said carrier member, means on said carrier for adjusting the angular position of said slide element with relation to said line of movement, an operative slide pivot connection between said slide element and said lens moving member, said slide element center and the pivot axis of said slide pivot connection being co-axial at one point in the movement of said carrier member, and means for moving the carrier member.

6. In a lens focusing mechanism, the combination of a movable lens moving member adapted to move a lens along its axis, a movable carrier member movable back and forth along a determined line, a slide element pivoted about a center on said carrier member and having a slide pivot connection with said lens moving member, means on said carrier for adjusting the angular position of said slide element with relation to said line of movement, said means comprising a swiveled lead screw pivoted on said carrier member and a nut member working on said screw and connected with said slide element, said slide element center and said slide pivot connection being co-axial at one point in the movement of said carrier member, and means for moving the carrier member.

7. In a lens focusing mechanism, the combination of a movable lens moving member adapted to move a lens along its axis, a movable carrier member movable back and forth along a determined line, a slide element pivoted about a center on said carrier member and having a slide pivot connection with said lens moving member, means on said carrier for adjusting the angular position of said slide element with relation to said line of movement, said means comprising a swiveled lead screw pivoted on said carrier member and a nut member working on said screw and pivotally connected with said slide element, said slide element center and said pivot connection being co-axial at one point in the movement of said carrier member, and means for moving the carrier member.

8. In a lens focusing mechanism, the combination of a movable lens moving member adapted to move a lens along its axis, a movable carrier member movable back and forth along a determined line, a slide element pivoted about a center on said carrier member and having a slide pivot connection with said lens moving member, means on said carrier member for adjusting the angular position of said slide element with relation to said line of movement, said means comprising a rotatable lead screw having a mounting on said carrier member and a nut member working on said screw and connected with said slide element, said slide element center and said slide pivot connection being co-axial at one point in the movement of said carrier member, and means for moving the carrier member.

9. In a lens focusing mechanism, the combination of a movable lens moving member adapted to move a lens along its axis, a movable carrier member movable back and forth along a determined line, a slide element pivoted about a center on said carrier member and having a slide pivot connection with said lens moving member, means on said carrier for adjusting the angular position of said slide element with relation to said line of movement, said means comprising a rotatable lead screw having a pivotal mounting on said carrier member and a nut member working on said screw and connected with said slide element, said slide element center and said slide pivot connection being co-axial at one point in the movement of said carrier member, and means for moving the carrier member.

10. In a lens focusing mechanism, the combination of a movable lens moving member adapted to move a lens along its axis, a movable carrier member movable back and forth along a determined line, a slide element pivoted about a center on said carrier member and having a slide pivot connection with said lens moving member, means on said carrier member for adjusting the angular position of said slide element with relation to said line of movement, said means comprising a rotatable lead screw having a pivotal mounting on said carrier member and a nut member working on said screw and trunnioned to said slide element at a point removed from the center mounting of said slide element on the carrier member, said slide element center and said slide pivot connection being co-axial at one point in the movement of said carrier member, and means for moving the carrier member.

11. In a lens focusing mechanism, the combination of a lens moving member movable along a determined line, a carrier member movable along a determined line, a slide element angularly adjustable about a center on said carrier member with relation to said lines of movement of said carrier and lens moving members, a member pivoted on said lens moving member on a pivot axis at right angles to the plane of angular movement of said slide element and slidingly engaged by said slide element, said last mentioned pivot axis and the center of said slide element being co-axial at one point in the movement of said carrier member, and means for moving said carrier member.

12. In a lens focusing mechanism, the combination of a lens moving member movable along a determined line, a carrier member movable along a determined line, an angularly adjustable slide element carried on said carrier member, a slide block pivoted on said lens moving member on an axis at right angles to the plane of angular adjustment of said slide element, said slide block slidingly engaged by said slide element, mounting means on the slide element pivoted on the carrier member on a center axis parallel to said slide block axis and located to coincide with said slide block axis at a point in the movement of the carrier member, means for supporting the slide element on the carrier member in different angular positions about said center axis, and means for moving the carrier member.

13. In a lens focusing mechanism, the combination of a lens moving member movable along a determined line, a carrier member movable along a determined line, an angularly adjustable slide element carrier on said carrier member, a slide block pivoted on said lens moving member on an axis at right angles to the plane of angular adjustment of said slide element, said slide block slidingly engaged by said slide element, a yoke fixed on the slide element adapted to straddle said pivoted slide block, said yoke pivoted on said carrier member on a center axis parallel to said slide block axis and located to coincide with said slide block axis at a point in the movement of the carrier member, means for supporting the slide element on the carrier member in different angular positions about said center axis, and means for moving the carrier member.

14. In a lens focusing mechanism, the combination of a movable lens moving member adapted to move a lens along its axis, a carrier member movable back and forth along a determined line, an angularly adjustable slide element carried on said carrier element and having a slide pivot connection with said lens moving member, a mounting member on one end of said slide element pivoted on the carrier member on a center axis parallel to said slide pivot axis and located to coincide with said slide pivot axis at a point in the movement of the carrier member, adjustable mounting means connected with the other end of said slide element for supporting said slide element at different angular positions about its pivot mounting on the carrier member, and means for moving the carrier member.

15. In a lens focusing mechanism, the combination of a movable lens moving member adapted to move a lens along its axis, a carrier member movable back and forth along a determined line, an angularly adjustable slide element carried on said carrier element and having a slide pivot connection with said lens moving member, a mounting member on one end of said slide element pivoted on the carrier member on a center axis parallel to said slide pivot axis and located to coincide with said slide pivot axis at a point in the movement of the carrier member, adjustable mounting means connected with the other end of said slide element for supporting said slide element at different angular positions about its pivot mounting on the carrier member, an indicator carried by the last mentioned end of the slide element, a lens focus scale traversed by said indicator, manually operated means for moving said carrier, an indicator carried by said means, and a distance scale traversed by the last mentioned indicator.

16. In a camera lens focusing mechanism, the combination of a lens moving member mounted to slide back and forth in a line parallel to the axis of the camera lens and adapted to move the lens along its axis, a carrier member mounted to slide along a line substantially transverse to the direction of movement of said lens moving member, a slide rod angularly adjustable about a center on said carrier member relative to the line of movement of the carrier member, a slide pivot connection between said slide rod and said lens moving member, said slide pivot axis and said slide rod center being co-axial at a point in the movement of the carrier member, and means for moving the carrier member.

17. In a camera lens focusing mechanism, the combination of a lens moving member mounted to slide back and forth in a line parallel to the axis of the camera lens and adapted to move the lens along its axis, a carrier member mounted to slide along a determined line, a slide rod angularly adjustable about a center on said carrier member relative to the line of movement of the carrier member, a slide pivot connection between said slide rod and said lens moving member, said slide pivot axis and said slide rod center being co-axial at a point in the movement of the carrier member, and means for moving the carrier member.

18. In a lens focusing mechanism, the combination of a lens movable along its axis, a straight line cam member movable rectilinearly and adjustable in angle to its rectilinear line of movement, and follower means for said cam member for transmitting movement derived therefrom to the lens, said means embodying only straight line movement transmitting parts.

19. In a lens focusing mechanism, the combination of a lens movable along its axis, a straight line cam member movable rectilinearly and angularly adjustable about a center with respect to its rectilinear line of movement, and cam follower means pivotally and slidably engaged by said angularly adjustable cam member, the center of said pivotal engagement and the center of angular cam adjustment being co-axial at one point in the rectilinear movement of said cam member.

20. In a lens focusing mechanism, the combination of a lens movable along its axis, manual focusing means including a manually movable focusing member constrained to movement in a single fixed path of definite length for focusing over the entire focusing range from close-up to infinity for lenses of all focal lengths, adjustable velocity-ratio motion transmitting means adapted to receive motion from the last mentioned member, and to deliver motion in direct proportion to the motion received and with velocity-ratio dependent upon its adjustment, and means adapted to receive the adjusted proportionate motion delivered by the motion transmitting means and to cause axial motion of the lens in direct proportion thereto.

GEORGE A. MITCHELL.